US 8,402,489 B2

(12) United States Patent
Ishida et al.

(10) Patent No.: US 8,402,489 B2
(45) Date of Patent: Mar. 19, 2013

(54) CONTENT PRESENTATION SYSTEM, CONTENT PRESENTATION METHOD, CONTENT PRESENTATION ASSISTANCE SERVER, CONTENT PRESENTATION ASSISTANCE METHOD, AND INFORMATION STORAGE MEDIUM

(75) Inventors: Takayuki Ishida, Kanagawa (JP); Hirotoshi Maegawa, Tokyo (JP)

(73) Assignees: Sony Corporation, Tokyo (JP); Sony Computer Entertainment, Inc., Tokyo (JP)

( * ) Notice: Subject to any disclaimer, the term of this patent is extended or adjusted under 35 U.S.C. 154(b) by 873 days.

(21) Appl. No.: 11/636,079

(22) Filed: Dec. 8, 2006

(65) Prior Publication Data

US 2007/0136756 A1 Jun. 14, 2007

(30) Foreign Application Priority Data

Dec. 12, 2005 (JP) ................................ 2005-358152

(51) Int. Cl.
   *G06F 3/00* (2006.01)
(52) U.S. Cl. ................................ 725/46; 725/45; 725/47
(58) Field of Classification Search ................ 725/44–47
   See application file for complete search history.

(56) References Cited

U.S. PATENT DOCUMENTS

| | | | |
|---|---|---|---|
| 6,384,869 B1 * | 5/2002 | Sciammarella et al. ...... 348/564 |
| 6,608,633 B1 * | 8/2003 | Sciammarella et al. ...... 715/700 |
| 6,704,931 B1 * | 3/2004 | Schaffer et al. ................. 725/46 |
| 6,996,572 B1 * | 2/2006 | Chakrabarti et al. .......... 707/102 |
| 7,188,355 B1 * | 3/2007 | Prokopenko et al. ........... 725/46 |
| 2001/0004733 A1 * | 6/2001 | Eldering .......................... 705/14 |
| 2002/0133820 A1 * | 9/2002 | Arai et al. ....................... 725/39 |
| 2003/0005441 A1 * | 1/2003 | Inoue .............................. 725/39 |
| 2003/0051240 A1 * | 3/2003 | Schaffer et al. ................. 725/34 |
| 2003/0149981 A1 * | 8/2003 | Finster et al. ................... 725/46 |
| 2004/0040040 A1 * | 2/2004 | Danker et al. ................... 725/46 |
| 2004/0268390 A1 * | 12/2004 | Ibrahim Sezan et al. ....... 725/35 |
| 2005/0081158 A1 * | 4/2005 | Hwang ........................... 715/740 |
| 2005/0097606 A1 * | 5/2005 | Scott et al. ...................... 725/52 |

* cited by examiner

*Primary Examiner* — Farzana Hossain
(74) *Attorney, Agent, or Firm* — Frommer Lawrence & Haug LLP; William S. Frommer; Paul A. Levy

(57) ABSTRACT

To make it possible for a user to smoothly find content which satisfies the user's current taste without the need to carry out a troublesome input operation. Each of the content reproduction devices reproduces a content selected from among one or more reproduction object contents according to designation by the user. The content presentation assistance server analyzes, for every user attribute, relevance of one or more symbols relevant to each of the contents reproduced according to the designation of the user having that user attribute, and sends an analyzed result to the content reproduction used by the user having user attribute relevant to that analyzed result. Each of the content reproduction devices acquires, for the content, one or more relevant symbols, and displays content relevance information which describes the relevance of the reproduction object contents based on the symbols and the analyzed result.

17 Claims, 8 Drawing Sheets

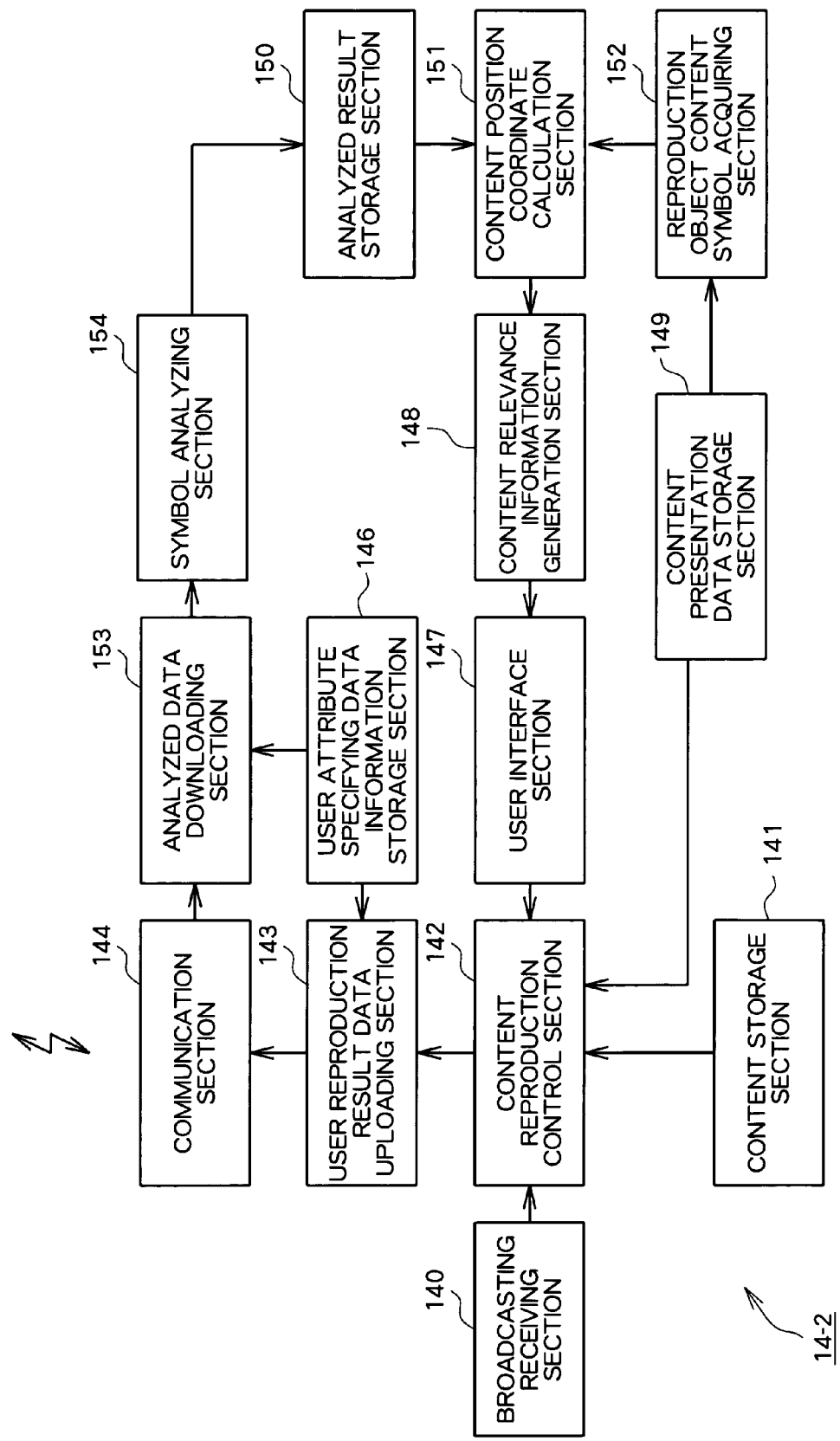

CONTENT PRESENTATION SYSTEM, CONTENT PRESENTATION METHOD, CONTENT PRESENTATION ASSISTANCE SERVER, CONTENT PRESENTATION ASSISTANCE METHOD, AND INFORMATION STORAGE MEDIUM

BACKGROUND OF THE INVENTION

1. Field of the Invention

The present invention relates to a content presentation system, a content presentation method, a content presentation assistance server, a content presentation assistance method, and an information storage medium, and in particular to a technique employed in a content reproduction device, for presenting appropriate content to a user.

2. Description of the Related Art

In recent years, cable television, satellite broadcasting, and so forth have developed at a remarkable pace, and along with the prevalence of these systems, a vast amount of content has been aired. At the same time, the capacity of data storage means such as hard disk drives or the like has also increased significantly. Consequently, there may be cases where a vast amount of content is recorded and stored in a content reproduction device such as a hard disk recording device or the like, and smooth extraction of desired content from among the vast amount of content stored therein accordingly becomes difficult.

In order to address this situation, a content reproduction device equipped with a search function by which contents which fall in an accommodated search condition, such as a search key word or the like, is found or a recommendation function by which contents which meet the user's taste is found based on the history of contents reproduced by the user and is recommended to the user for review are available. With this arrangement, the user can readily find contents while utilizing these functions.

However, the search function has a shortcoming in that an appropriate result cannot be obtained unless an appropriate search condition is given. In addition, an operation to input a search condition including a key word or the like is generally troublesome. Also, even though the determination about the user's taste is made based on the history of contents reproduced by the user during a limited period of time in the past, it is not always true that the user still has the same taste, as personal taste may vary. Therefore, it is not always possible for the recommendation function to recommend appropriate content to the user.

The present invention has been conceived in view of the above and aims to provide a content presentation system, a content presentation method, a content presentation assistance server, a content presentation assistance method, and an information storage medium, all for allowing users to achieve instant finding of content which meets their present taste without the need to conduct a troublesome input operation.

SUMMARY OF THE INVENTION

In order to solve the above described problems, according to one aspect of the present invention, there is provided a content presentation system having a content presentation assistance server and a plurality of content reproduction devices connected via a network for communication to the content presentation assistance server, wherein the content reproduction devices each comprise reproduction means for reproducing content, from among one or more reproduction object contents, according to designation by a user, the content presentation assistance server comprises symbol analysis means for analyzing, for every user attribute, relevance of one or more symbols relevant to the content reproduced according to the designation by the user having that user attribute, and analyzed result transmission means for sending an analyzed result obtained by the symbol analysis means to the content reproduction device used by the user having user attribute relevant to that analyzed result, and the content reproduction devices each further comprise analyzed result receiving means for receiving the analyzed result obtained by the symbol analysis means and sent from the content presentation assistance server, reproduction object content symbol acquiring means for acquiring one or more symbols relevant to some or all of the one or more reproduction object contents, and content relevance information display means for displaying content relevance information which describes relevance of some or all of the one or more reproduction object contents, based on the analyzed result received by the analyzed result receiving means and the symbol/symbols acquired by the reproduction object content symbol acquiring means.

According to another aspect of the present invention, there is provided a content presentation method which uses a content presentation system having a content presentation assistance server and a plurality of content reproduction devices connected via a network for communication to the content presentation assistance server, the method comprising: a reproduction step of reproducing, with each of the content reproduction devices, content, among one or more reproduction object contents, corresponding to designation by a user; a symbol analysis step of analyzing, using the content presentation assistance server, for every user attribute, relevance of one or more symbols relevant to the content reproduced according to the designation by the user having that user attribute; an analyzed result transmission step of sending, using the content presentation assistance server, an analyzed result obtained in the symbol analysis step to the content reproduction device used by the user having a user attribute relevant to that analyzed result; an analyzed result receiving step of receiving, using each of the content reproduction devices, an analyzed result obtained in the symbol analysis step and sent from the content presentation assistance server; a reproduction object content symbol acquiring step of acquiring, using each of the content reproduction devices, one or more symbols relevant to some or all of the one or more reproduction object contents; and a content relevance information display step of displaying, using each of the content reproduction devices, content relevance information which describes relevance of some or all of the one or more reproduction object contents, based on the analyzed result received in the analyzed result receiving step and the symbol/symbols acquired in the reproduction object content symbol acquiring step.

According to still another aspect of the present invention, there is provided a content presentation assistance server connected via a network for communication with a plurality of content reproduction devices, comprising: symbol receiving means for receiving one or more symbols relevant to content reproduced by reproduction means of each of the content reproduction devices, together with information concerning a user of that content reproduction device; symbol analysis means for analyzing, for every user attribute of the users of the content reproduction devices, relevance of each of the symbols sent from the content reproduction devices used by the users having that user attribute; and analyzed result transmission means for sending an analyzed result obtained by the symbol analysis means to each of the content reproduction devices used by the users having that user attribute relevant to the analyzed result.

According to yet aspect of the present invention, there is provided a content presentation assistance method employed by a content presentation assistance server connected via a network for communication with a plurality of content reproduction devices, comprising: a symbol receiving step of receiving one or more symbols relevant to content reproduced by reproduction means of each of the content reproduction devices, together with information concerning a user of that content reproduction device; a symbol analysis step of analyzing, for every user attribute of the users of the content reproduction devices, relevance of each of the symbols sent from the content reproduction devices used by the users having that user attribute; and an analyzed result transmission step of sending an analyzed result obtained in the symbol analysis step to each of the content reproduction devices used by the users having that user attribute relevant to the analyzed result.

According to yet aspect of the present invention, there is provided a computer readable information storage medium storing a program to be executed by a content presentation assistance server connected via a network for communication with a plurality of content reproduction devices, for causing the content presentation assistance server to function as: symbol receiving means for receiving one or more symbols relevant to content reproduced by reproduction means of each of the content reproduction devices, together with information concerning a user of that content reproduction device; symbol analysis means for analyzing, for every user attribute of the users of the content reproduction devices, relevance of each of the symbols sent from the content reproduction devices used by the users having that user attribute; and analyzed result transmission means for sending an analyzed result obtained by the symbol analysis means to each of the content reproduction devices used by the users having that user attribute relevant to the analyzed result.

The computer readable recording medium may be a CD-ROM, a DVD-ROM, or the like, for example.

In the content presentation assistance server according to the present invention, analysis is performed for every user attribute, with respect to relevance of one or more symbols relevant to each of the contents reproduced according to designation by a user having that user attribute. The analyzed result for every user attribute is sent to the content reproduction device used by a user having that user attribute.

In the content reproduction device, content relevance information which describes the relevance of the reproduction object content is displayed based on the analyzed result and a symbol relevant to the reproduction object content.

Therefore, according to the present invention, symbol analysis is carried out using a symbol relevant to the content which is actually reproduced according to the designation of a user having the same user attribute as that of the user concerned, and content relevant information is displayed based on the analyzed result. This makes it possible to achieve content presentation based on the actual state of review by the users having the same user attribute as that of the user concerned.

In addition, the user can smoothly find content which meets the user's present taste without the need to input a search condition or the like, and while referring to the content relevant information which describes relevance of the respective reproduction object contents.

In the content presentation system as described above, the content reproduction devices may each further comprise content symbol data generation means for generating, for each of some or all of the contents reproduced by the reproduction means, content symbol data containing one or more symbols relevant to that content, and user reproduction result data transmission means for sending to the content presentation assistance server, user reproduction result data which contains information concerning the user of that content reproduction device and the content symbol data generated by the content symbol data generation means, the content presentation assistance server may further comprise user reproduction result data receiving means for receiving the user reproduction result data sent from the user reproduction result data transmission means of each of the content reproduction devices, and the symbol analysis means may analyze, for every user attribute of the users of the content reproduction devices, the relevance of each of the symbols contained in the content symbol data based on the content symbol data which is contained, together with the information concerning the user having that user attribute, in the user reproduction result data.

With this arrangement, symbol analysis can be readily achieved in which the real state of review by users having the same user attribute as that of the user concerned is reflected.

According to yet another aspect of the present invention, there is provided a content presentation system having a content presentation assistance server and a plurality of content reproduction devices connected via a network for communication to the content presentation assistance server, wherein the content reproduction devices each comprise reproduction means for reproducing a content among one or more reproduction object contents according to designation by a user, content symbol data generation means for generating, for each of some or all of the contents reproduced by the reproduction means, content symbol data containing one or more symbols relevant to that content, and user reproduction result data transmission means for sending to the content presentation assistance server, user reproduction result data which contains information concerning the user and the content symbol data generated by the content symbol data generation means, and the content presentation assistance server further comprises user reproduction result data receiving means for receiving the user reproduction result data sent from the user reproduction result data transmission means of each of the content reproduction devices, analyzed data generation means for generating, for each of a plurality of user attributes, analyzed data which contains the content symbol data which is contained, together with the information concerning the user having that user attribute, in the user reproduction result data, and analyzed data transmission means for sending the analyzed data relevant to some or all of the user attributes to some or all of the plurality of content reproduction devices, the content reproduction devices each further comprise analyzed data receiving means for receiving the analyzed data sent from the analyzed data transmission means, symbol analysis means for analyzing relevance of each of the symbols contained in the content symbol data based on the content symbol data contained in the analyzed data relevant to the user attribute of the user of at least that content reproduction device, reproduction object content symbol acquiring means for acquiring one or more symbols relevant to some or all of the one or more production object contents, and content relevance information display means for displaying content relevance information which describes relevance of some or all of the one or more reproduction object contents, based on an analyzed result obtained by the symbol analysis means and the symbol/symbols acquired by the reproduction object content symbol acquiring means.

According to yet another aspect of the present invention, there is provided a content presentation method which uses a content presentation system having a content presentation assistance server and a plurality of content reproduction devices connected via a network for communication to the content presentation assistance server, the method comprising: a reproduction step of reproducing, using each of the content reproduction devices, content among one or more reproduction object contents according to designation by a user; a content symbol data generation step of generating, using each of the content reproduction devices, for each of some or all of the contents reproduced by the reproduction means, content symbol data containing one or more symbols relevant to that content; a user reproduction result data transmission step of sending to the content presentation assistance server, using each of the content reproduction devices, user reproduction result data which contains information concerning the user and the content symbol data generated in the content symbol data generation step; a user reproduction result data receiving step of receiving, using the content presentation assistance server, the user reproduction result data sent in the user reproduction result data transmission step from each of the content reproduction devices; an analyzed data generation step of generating, using the content presentation assistance server, for each of a plurality of user attributes, analyzed data which contains the content symbol data which is contained, together with the information concerning the user having that user attribute, in the user reproduction result data; an analyzed data transmission step of sending, using the content presentation assistance server, the analyzed data relevant to some or all of the user attributes to some or all of the plurality of content reproduction devices; an analyzed data receiving step of receiving, using each of the content reproduction devices, the analyzed data sent in the analyzed data transmission step; a symbol analysis step of analyzing, using each of the content reproduction devices, relevance of each of the symbols contained in the content symbol data, based on the content symbol data contained in the analyzed data relevant to user attribute of the user of at least that content reproduction device; a reproduction object content symbol acquiring step of acquiring, using each of the content reproduction devices, one or more symbols relevant to some or all of the one or more production object contents, and a content relevance information display step of displaying, using each of the content reproduction devices, content relevance information which describes relevance of some or all of the one or more reproduction object contents, based on an analyzed result obtained in the symbol analysis step and each of the symbol/symbols acquired by the reproduction object content symbol acquiring means.

According to yet another aspect of the present invention, there is provided a content reproduction device, comprising: reproduction means for reproducing content, among one or more reproduction object contents, according to designation by a user, analyzed data acquiring means for acquiring analyzed data, in which the analyzed data contains one or more content symbol data, and the content symbol data contains one or more symbols relevant to content reproduced according to designation by a user and having a user attribute identical to a user attribute of the user; symbol analysis means for analyzing relevance of each of the symbols contained in the content symbol data based on the content symbol data contained in the analyzed data; reproduction object content symbol acquiring means for acquiring, for some or all of the one or more reproduction object contents, one or more symbols relevant to the reproduction object contents; and content relevance information display means for displaying content relevance information describing mutual relevance of some or all of the one or more reproduction object contents, based on an analyzed result obtained by the symbol analysis means and the symbols acquired by the reproduction object content symbol acquiring means.

According to yet another aspect of the present invention, there is provided content reproduction method, comprising: a reproduction step of reproducing content, among one or more reproduction object contents, according to designation by a user, an analyzed data acquiring step of acquiring analyzed data, in which the analyzed data contains one or more content symbol data, and the content symbol data contains one or more symbols relevant to content reproduced according to designation by a user having user attribute identical to a user attribute of the user; a symbol analysis step of analyzing relevance of each of the symbols contained in the content symbol data based on the content symbol data contained in the analyzed data; a reproduction object content symbol acquiring step of acquiring, for some or all of the one or more reproduction object contents, one or more symbols relevant to the reproduction object contents; and a content relevance information display step of displaying content relevance information describing mutual relevance of some or all of the one or more reproduction object contents, based on an analyzed result obtained in the symbol analysis step and each of the symbols acquired in the reproduction object content symbol acquiring step.

According to yet another aspect of the present invention, there is provided a computer readable information storage medium storing a program for causing a computer to function as reproduction means for reproducing content, among one or more reproduction object contents, according to designation by a user, analyzed data acquiring means for acquiring analyzed data, in which the analyzed data contains one or more content symbol data, and the content symbol data contains one or more symbols relevant to a content reproduced according to designation by a user having user attribute identical to user attribute of the user; symbol analysis means for analyzing relevance of each of the symbols contained in the content symbol data based on the content symbol data contained in the analyzed data; reproduction object content symbol acquiring means for acquiring, as for some or all of the one or more reproduction object contents, one or more symbols relevant to the reproduction object contents; and content relevance information display means for displaying content relevance information describing mutual relevance of some or all of the one or more reproduction object contents, based on an analyzed result obtained by the symbol analysis means and the symbols acquired by the reproduction object content symbol acquiring means.

As described above, in the case where a symbol analysis carried out by the device for reproducing content, presentation of content in which the actual state of review by a user having a user attribute identical to that of the user concerned becomes similarly possible.

Also, the user can instantly find content which meets their current taste without the need to input a search condition or the like and while referring to the content relevance information which describes the relevance of the respective reproduction object contents.

In the content presentation system described above, the symbol analysis means may comprise first symbol position coordinates calculation means for calculating position coordinates in a first space having coordinate axes each corresponding to each of the contents reproduced according to the designation by the user having each user attribute, of each of the symbols relevant to the contents, and characteristic direction calculation means for calculating one or more characteristic directions in the first space based on the position coordinates calculated by the first symbol position coordinates calculation means.

The content relevance information display means may comprise content position coordinates calculation means for calculating position coordinates in a second space having coordinate axes each corresponding to each of the respective characteristic directions, of some or all of the one or more reproduction object contents based on each of the symbols relevant to the contents reproduced according to the designation of the user having each user attribute and each of the symbols acquired by the reproduction object content symbol acquiring means, and display as the content relevance information an image representative of a part or whole of the second space where the position coordinates of some or all of the contents calculated by the content position coordinates calculation means are distinctively displayed.

In the content presentation system described above, the first symbol position coordinates calculation means may calculate position coordinates of each of the symbols relevant to the contents reproduced according to the designation by the user having each user attribute, the position coordinates having as coordinate components, values each indicative of presence, absence, or degree of relevance to each of the contents reproduced according to the designation by the user.

In the content presentation system described above, the characteristic direction calculation means may calculate one or more eigenvectors of a similarity matrix which has as element similarities between the position coordinates calculated by the first position coordinates calculation means, and determines the one or more eigenvectors as the one or more characteristic directions.

In the content presentation system described above, the symbol analysis means further may comprise second position coordinates calculation means for calculating position coordinates in the second space, of each of the symbols, based on the characteristic direction calculated by the characteristic direction calculation means and each of the position coordinates calculated by the first position coordinates calculation means. Further, the content position coordinates calculation means may acquire position coordinates in the second space, of some or all of the symbols acquired by the reproduction object content symbol acquiring means from among the position coordinates of the symbols calculated by the second position coordinates calculation means, and calculate position coordinates of some or all of the one or more reproduction object contents based on the position coordinates thereof.

In the content presentation system described above, the second position coordinates calculation means may calculate position coordinates in the second space, of each of the symbols, based on an inner product of the characteristic direction calculated by the characteristic direction calculation means and the position coordinates calculated by the first position coordinates calculation means.

BRIEF DESCRIPTION OF THE DRAWINGS

FIG. 11 is a block diagram showing the functions of a modified example of the content reproduction device.

DESCRIPTION OF THE PREFERRED EMBODIMENTS

In the following, one embodiment of the present invention will be described in detail based on the accompanied drawings.

Figure 1:
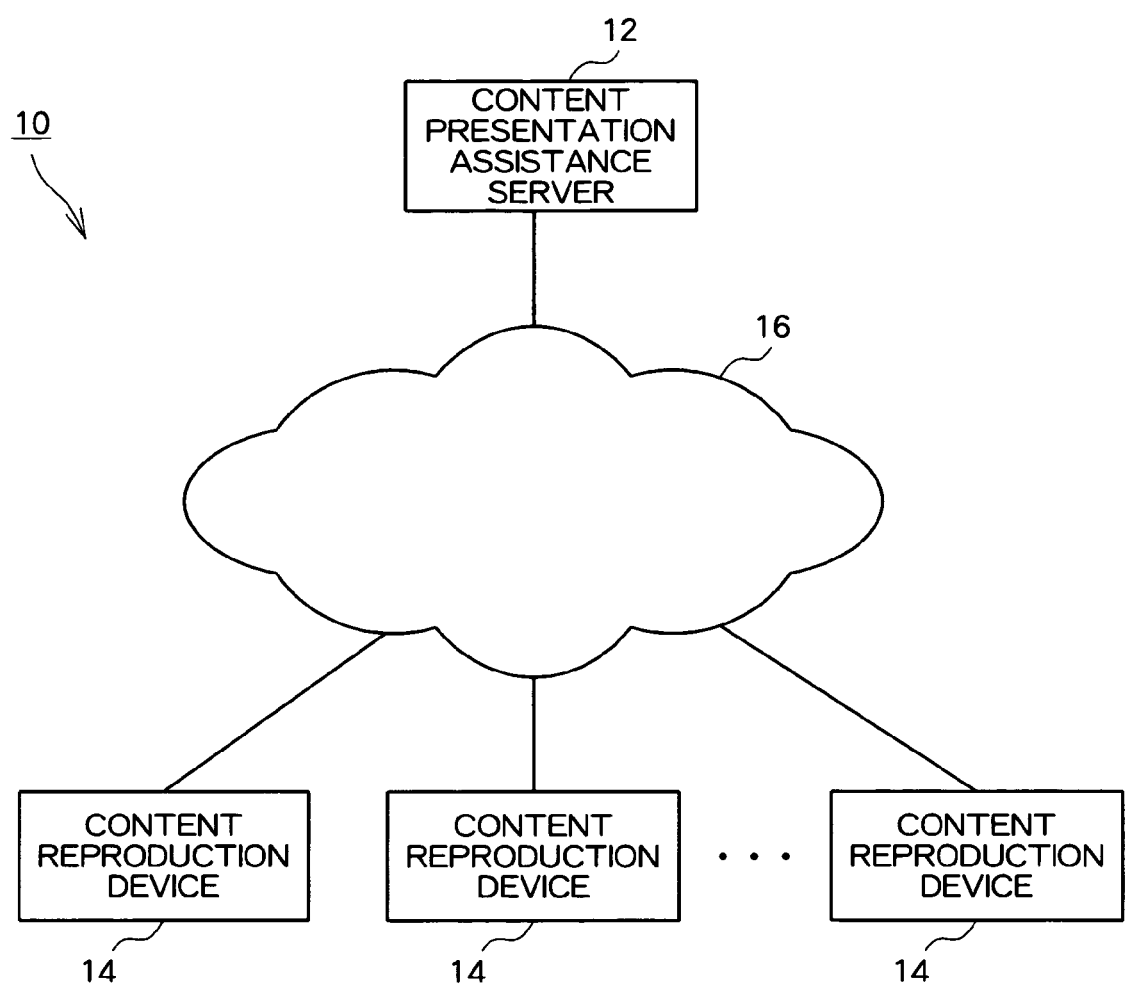
FIG. 1 is a diagram showing an overall structure of a content presentation system according to an embodiment of the present invention.

FIG. 1 is a diagram showing an overall structure of a content presentation system according to one embodiment of the present invention. As shown in FIG. 1, the content presentation system 10 is constructed comprising a content presentation assistance server 12 and a plurality of content reproduction devices 14, all connected to a data communication network 16, such as the Internet, for data communication. The content presentation assistance server 12 is formed comprising a known server computer, for example, and managed by an operator of the system. Each of the content reproduction devices 14 is installed in each household, for example.

Figure 2:
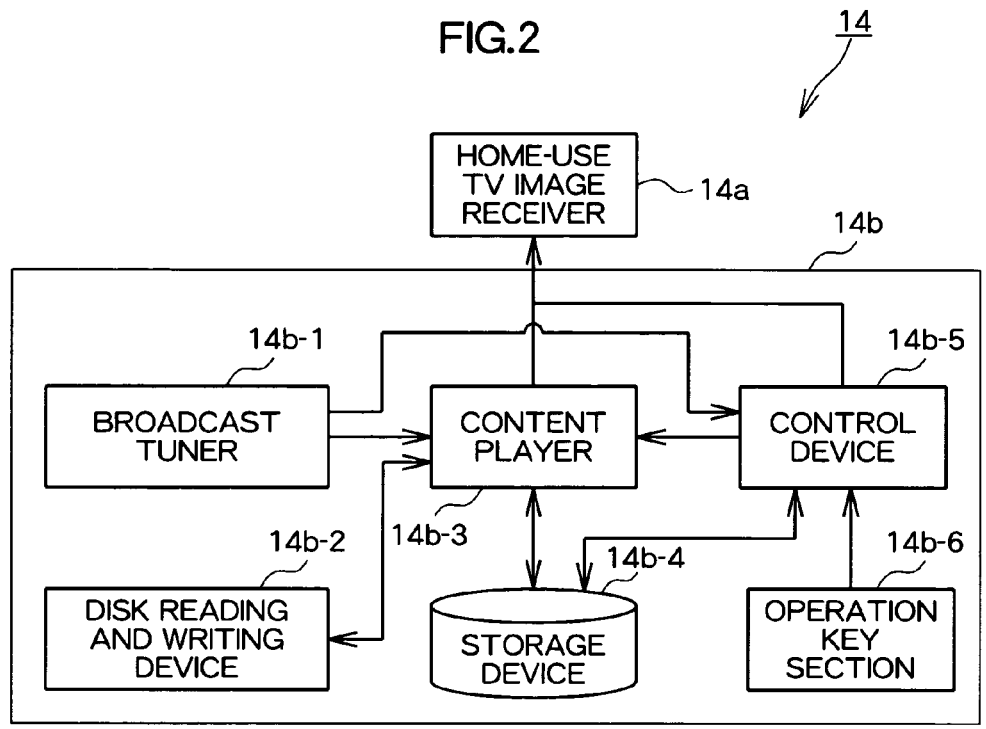
FIG. 2 is a diagram showing a hardware structure of a content reproduction device according to an embodiment of the present invention.

FIG. 2 is a diagram showing a hardware structure of the content reproduction device 14. As shown in FIG. 2, the content reproduction device 14 is constructed comprising a main body 14b and a home-use television image receiver 14a connected to the main body 14b. The main body 14b comprises a broadcast tuner 14b-1, a disk reading and writing device 14b-2, a content player 14b-3, a storage device 14b-4, a control device 14b-5, and an operation key section 14b-6. The broadcast tuner 14b-1 receives a broadcast signal for cable television broadcasts, terrestrial digital broadcasts, terrestrial analogue broadcasts, satellite broadcasts, and so forth, and converts the signal into a video signal before providing to the content player 14b-3. The broadcast tuner 14b-1 also receives EPG (Electric Program Guide) data and forwards to the control device 14b-5, which in turn stores the received EPG data in the storage device 14b-4.

The disk reading and writing device 14b-2 accepts a recording medium such as a DVD-ROM, a DVD-RAM, or the like, and records therein video content data based on a video signal output from the broadcast tuner 14b-1. Alternatively, the disk reading and writing device 14b-2 reads video content data from the recording medium to provide to the content player 14b-3. The storage device 14b-4 is formed comprising, for example, a hard disk storage device, and stores video content data based on the video signal output from the broadcast tuner 14b-1 or reads video content data already stored to provide to the content player 14b-3. The storage device 14b-4 stores EPG data as described above.

The EPG data contains a variety of content presentation data (for example, cast, a director, a description regarding the content, and so forth) for introducing the content of a broadcast signal received by the broadcast tuner 14b-1. According to an instruction from the control device 14b-5, the content player 14b-3 reproduces the video content recorded in the recording medium which is currently accepted in the disk reading and writing device 14b-2, the video content stored in the storage device 14b-4, and the video content output from the broadcast tuner 14b-1, and outputs the reproduced signal to the home-use television image receiver 14a.

The operation key section 14b-6 has a plurality of operation keys, so that a user designates an operation of the content reproduction device 14 while utilizing the keys. The content of the operation designated via the operation keys is supplied to the control device 14b-5. The control device 14b-5, which is constructed having as a major component a computer provided with a CPU and a RAM, controls the operation of the content reproduction device 14. In particular, in order to allow the user to smoothly select video content out of the video contents recorded in the recording medium which is presently accepted in the disk reading and writing device 14b-2, the video content stored in the storage device 14b-4, and the video content output from the broadcast tuner 14b-1, content relevance information (image) which describes the mutual relevance among these video contents is created and displayed in the home-use television image receiver 14a.

Figure 3:
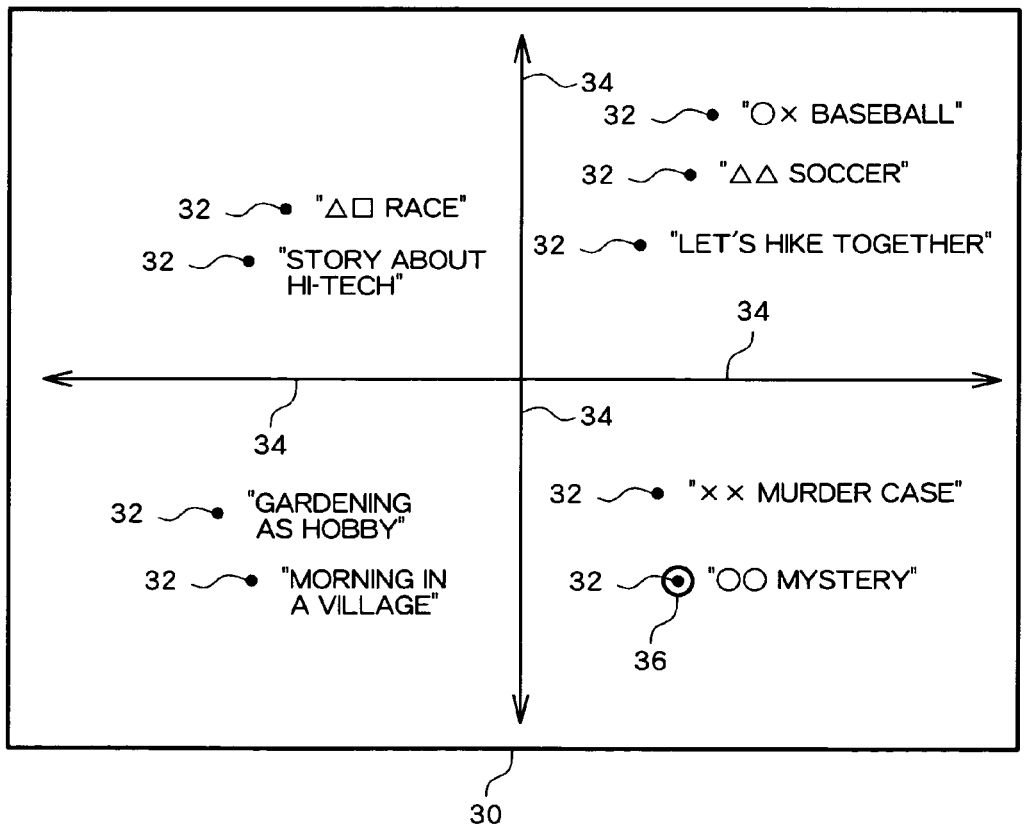
FIG. 3 is a diagram showing one example of content relevance information to be shown in a home-use television image receiver.

FIG. 3 is a diagram showing one example of content relevance information displayed in the home-use television image receiver 14a. In the content relevance information 30 shown in FIG. 3, a plurality of concept axes 34 are shown together with markers 32, each indicative of the position of the relevant video content relative to the concept axes 34. The concept axes 34 each define a concept which is appropriately used in classification and/or description of the moods of many video contents, and specifically define a typical concept, such as "enjoyable videos", "thrilling videos", and so forth, for example.

The title of the relevant video content is shown beside each marker 32. A cursor 36, which is shown at one of the markers 32, is designed to be moved to another marker 32 by a cursor moving key which is included in the operation key section 14b-6. With a reproduction key, also included in the operation key section 14b-6, depressed, reproduction of the video content corresponding to the marker 32 identified by the cursor 36 begins.

According to the content relevance information 30, the markers 32 of the video contents having similar contents are shown close to each other, while the markers 32 of the video contents having remarkably different contents are shown farther from each other. With this arrangement, the user can imagine the content and instruct reproduction of their desired video content while looking at the content relevance information 30 shown in the home-use television image receiver 14a.

The content relevance information 30 is created based on a symbol analyzed result which is created for every user attribute, and a symbol (a word, here) which is contained in the content presentation data (contained in EPG data) of each content.

Here, while the content relevance information 30 itself is created by and displayed in the content reproduction device 14, the symbol analysis for every user attribute is carried out by the content presentation assistance server 12, and the analyzed result is sent via the network 16 to the content reproduction device 14 which is used by a user having the user attribute relevant to that analyzed result. It should be noted that the symbol analysis may alternatively be carried out by the content reproduction device 14, as will described later.

Figure 4:
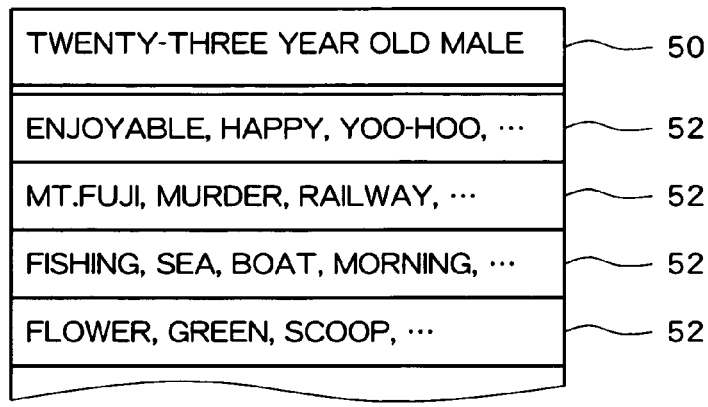
FIG. 4 is a diagram showing one example of a user reproduction result to be processed by a data content presentation assistance server.

The content presentation assistance server 12 receives user reproduction result data from each of the content reproduction devices 14 in order to carry out symbol analysis for every user attribute. The user reproduction result data contains, as shown in FIG. 4, user attribute specifying data (age and sex, here) 50 for specifying the user attribute of the user of that content reproduction device 14, and one or more content symbol data 52. It should be noted here that the content symbol data 52 is created for every content reviewed by the user, and contains (some or all) symbols contained in that content presentation data of that content.

The content presentation assistance server 12 receives user reproduction result data from each of the content reproduction devices 14. According to the user attribute specifying data 50 contained in the user reproduction result data, the content presentation assistance server 12 classifies the user reproduction result data, and merges the content symbol data 52 contained in the user reproduction result data sent from the content reproduction devices 14 used by users having identical user attributes. In this manner, analyzed data is created for every user attribute.

Figure 5:
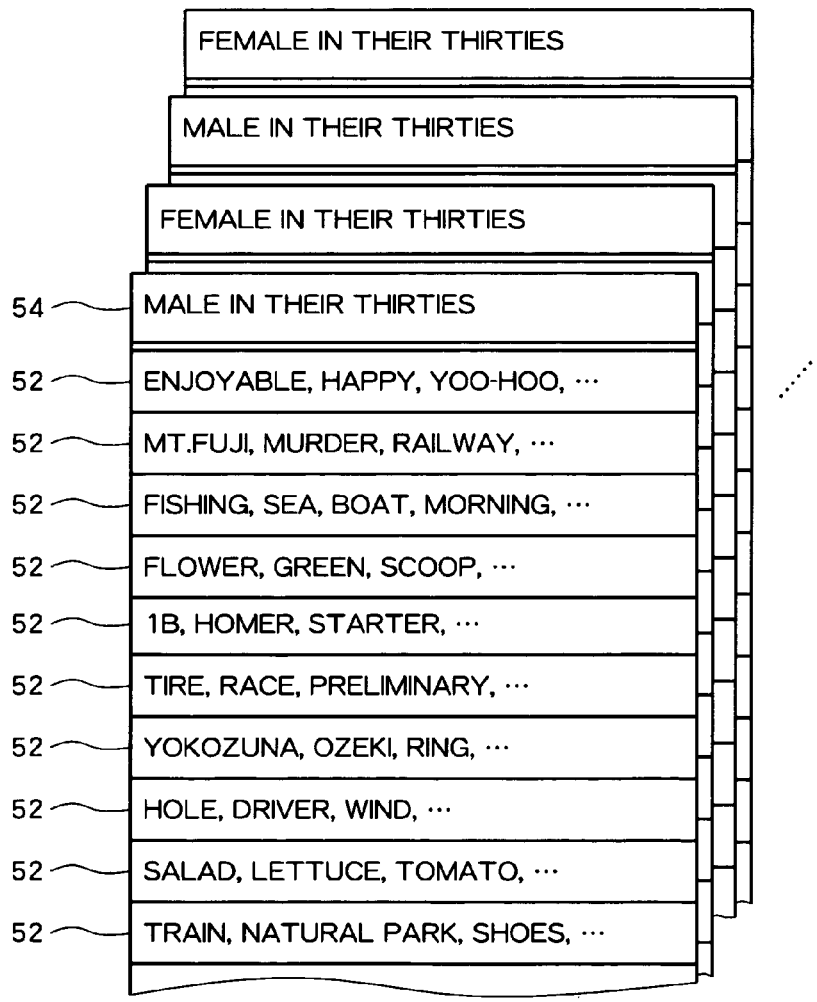
FIG. 5 is a diagram showing one example of analyzed data to be generated based on user reproduction result data.

FIG. 5 is a diagram showing one example of analyzed data. As shown in FIG. 5, the analyzed data is created for every user attribute. The analyzed data contains user attribute data 54 indicative of the user attribute, and a plurality of content symbol data 52.

In the following, a method for creating content relevance information 30 will be described in further detail.

Figure 6A:
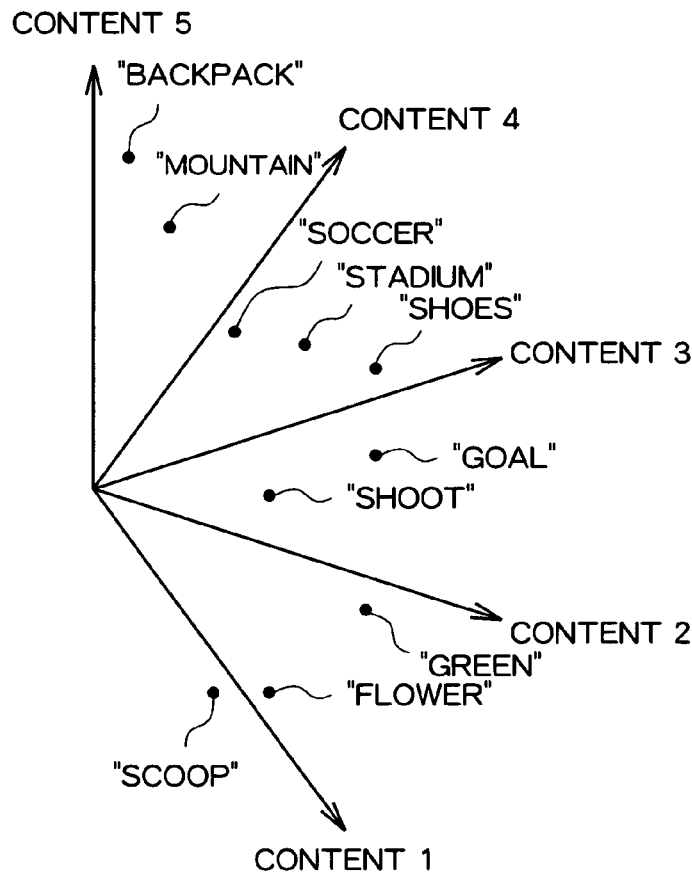
FIG. 6 is a diagram explaining a method for generating content relevance information.
Figure 6B:
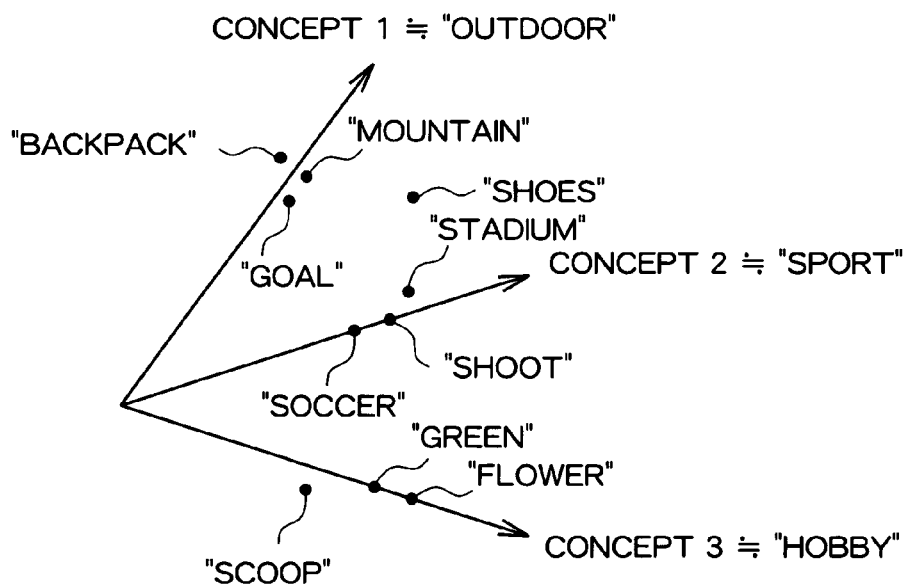

FIG. 6 is a conceptual diagram explaining a method for creating content relevance information 30 by the content presentation system 10. In the content presentation system 10, while relying on the fact that the words, or communication symbols, which are contained in the content presentation data (contained in the EPG data) of one video content, have mutual relevance, relevance between the words contained in the content presentation data of a plurality of video contents is analyzed.

Specifically, the content presentation assistance server 12 determines, for every user attribute, the degree of relevance of each word contained in the content presentation data of video content reviewed by a user having that user attribute, relative to each of the video contents. For example, when the word Wi is used once or more in the content presentation data of the k-th video content, the value of the degree of relevance of the word Wi relative to the k-th video content, namely, gki, is defined as one. Meanwhile when that word is not used at all, the value of the degree of relevance is defined as zero.

Also, the number of use or rank thereof of the word Wi in the content presentation data of the k-th video content may be defined as the value of the degree of relevance gki.

Thereafter, in the content presentation system 10, the content presentation assistance server 12 prepares, for every user attribute, a space (a first space) which is defined by the coordinate axes each corresponding to each of the video contents, and places the respective words in the first space. Here, the coordinate component of the position coordinates of the word Wi, which corresponds to the coordinate axis corresponding to the k-th video content is defined as gki. The position coordinates gi of the word Wi in the first space are defined by the following expression (1).

FIG. 6 (a) shows the respective words placed in the first space as described above.

[Expression 1]

$$gi = \begin{pmatrix} g1i \\ g2l \\ \vdots \\ gml \end{pmatrix} \quad (1)$$

Thereafter, the content presentation assistance server 12 calculates one or more characteristic directions of the first space based on the position coordinates of the words placed in the first space as described above. It should be noted here that a characteristic direction may be a direction indicative of an area where words are concentrically placed in the first space, or the like. The characteristic direction of the first space is calculated here as described below.

That is, the similarity Hij between the position coordinates gi of the word Wi in the first space and the position coordinates gj of another word Wj in the first space is calculated using the following expression (2), and a similarity matrix of NXN using the similarities Hij as ij elements, as shown in the following expression (3), is obtained, wherein N refers to the total number of words. Then, all or some of the eignvectors of the similarity matrix H are used as the characteristic directions.

[Expression 2]

$$Hij = \sum_{k} \frac{gki \cdot gkj}{\|gi\| \cdot \|gj\|} \quad (2)$$
$$= \frac{gi \cdot gj}{\|gi\| \cdot \|gj\|}$$

[Expression 3]

$$\begin{array}{cccccc} & W_1 & W_2 & W_3 & \ldots & W_n \end{array} \quad (3)$$
$$H = \begin{pmatrix} H_{11} & H_{12} & H_{13} & \ldots & H_{1n} \\ H_{21} & H_{22} & H_{23} & \ldots & H_{2n} \\ H_{31} & H_{32} & H_{33} & \ldots & H_{3n} \\ \vdots & \vdots & \vdots & & \vdots \\ H_{n1} & H_{n2} & H_{n3} & \ldots & H_{nn} \end{pmatrix} \begin{array}{c} W_1 \\ W_2 \\ W_3 \\ \vdots \\ W_n \end{array}$$

The similarity matrix is a real symmetric matrix, and the eigenvectors thereof can be calculated by means of power multiplication. Power multiplication has a function for enhancing a characteristic element and averaging a non-characteristic element of a matrix element. Therefore, an eigenvector calculated by means of power multiplication can be considered as expressing the characteristic direction implicated in the first space, in an explicit manner.

It should be noted that the method for calculating a characteristic direction is not limited to the above-described method in which an eigenvector of a similarity matrix is calculated, and any other methods are applicable as long as the method calculates a direction which is characteristic in the first space. For example, a direction or the like in the first space in which symbols are concentrically placed may be defined as a characteristic direction.

Thereafter, the content presentation assistance server 12 prepares a second space defined by the coordinate axes corresponding to the characteristic directions calculated for every user attribute as described above. The content presentation assistance server 12 then places the respective words in the second space, and calculates the position coordinates of the respective words in the second space.

FIG. 6 (*b*) shows the respective words replaced in the second space. Each of the coordinate axes of the second space corresponds to each of the characteristic directions of the first space, representing a typical meaning of a certain kind of word, ("outdoor", "sport", and "hobby" in the drawing).

In order to obtain the position coordinates of each word in the second space, specifically, an inner product of a vector indicative of the position coordinates of each word in the first space and a unit vector (that is, the eigenvector of the similarity matrix H with the magnitude of one) indicative of each characteristic direction in the first space is calculated, and the calculated value is used as the component of the position coordinates of the word in the second space, the component being relevant to the coordinate axis corresponding to that characteristic direction.

That is, the inner product of the unit vector ei (that is, the i-th eigenvector of the similarity matrix H with the magnitude of one) indicative of the characteristic direction in the first space and the position coordinates gj of the word Wj is used as the i component of the position coordinates of the word Wj in the second space, wherein $1 \leq i \leq M$ is held with M representing the total number of characteristic directions. The content presentation assistance server 12 sends the position coordinates of each word in the second space, which are calculated for every user attribute, to the content reproduction device 14 as a symbol analyzed result.

The content reproduction device 14 receives the symbol analyzed result corresponding to the user attribute of the user of that content reproduction device 14 from the content presentation assistance server 12, and calculates the position coordinates in the second space, of the video content to be produced by the content player 14*b*-3 (the video content recorded in the recording medium which is currently accepted in the disk reading and writing device 14*b*-2, the video content stored in the storage device 14*b*-4, and the video content output from the broadcast tuner 14*b*-1), based on the position coordinates in the second space, of each of the words contained in the symbol analyzed result.

For example, in the case where the position coordinates of a certain video content are calculated, a word whose position coordinates in the second space have already been calculated is selected from the words contained in the content presentation data of that video content. Then, based on the position coordinates in the second space, of these words (that is, the words having been replaced in the second space), the position coordinates of the video content are calculated.

Specifically, based on the barycenter of the words having been replaced in the second space or the barycenter having been weighted according to the degree of use in the content presentation data of the video content, the position coordinates of the video content are calculated. Thereafter, the image of the second space where a marker is placed at the point identified by the thus calculated position coordinates and the title of the relevant video content is shown next to the marker is created, and displayed as the content relevance information 30 in the home-use television image receiver 14*a*.

In the following, the function analyzing server 12 will be described in further detail.

Figure 7:
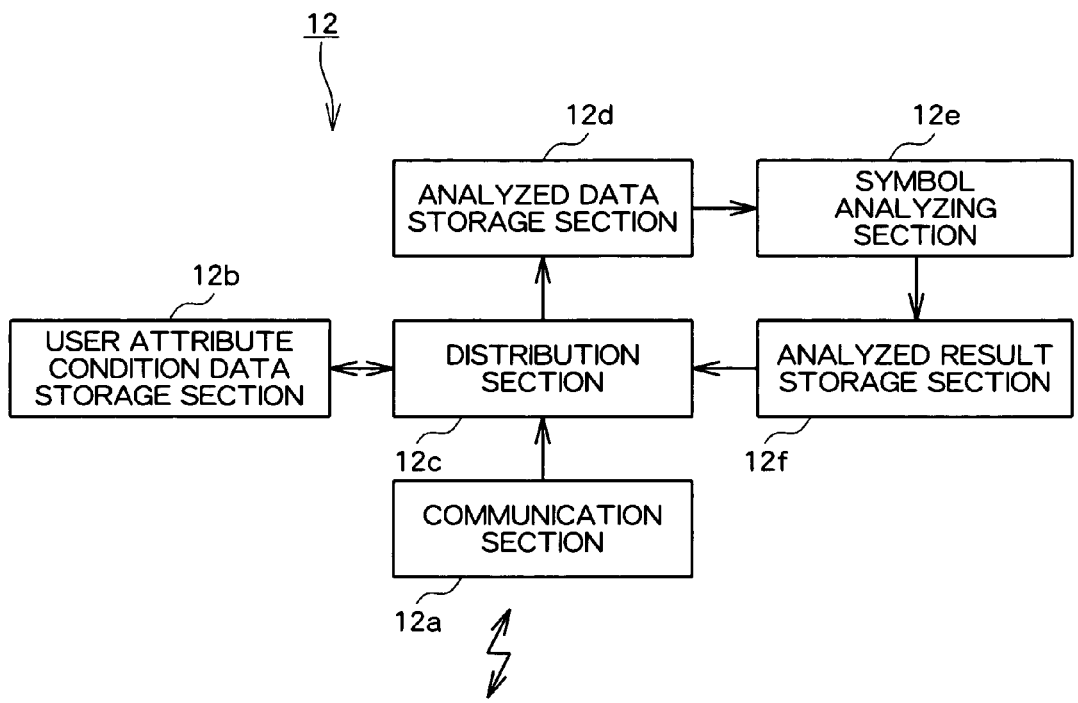
FIG. 7 is a block diagram showing the functions of a content presentation assistance server.

FIG. 7 is a block diagram showing the functions of the content presentation assistance server 12. The content presentation assistance server 12 comprises, in terms of functions, a communication section 12*a*, a user attribute condition data storage section 12*b*, a distribution section 12*c*, an analyzed data storage section 12*d*, a symbol analyzing section 12*e*, and an analyzed result storage section 12*f*. These functions are realized by the content presentation assistance server 12 by executing a program according to this embodiment. This program may be stored in a computer readable information storage medium, such as a CD-ROM, a DVD-ROM, or the like, and read from the information storage medium and installed into the content presentation assistance server 12.

Initially, the communication section 12*a* is connected to the network 16 to conduct data exchange with respect to each of the content reproduction devices 14. The communication section 12*a* receives the above-described user reproduction result data from the content reproduction device 14 and forwards to the distribution section 12c. The distribution section 12c, while referring to the user attribute specifying data 50 contained in the user reproduction result data, reads user attribute condition data indicative of the condition of each user attribute from the user attribute condition data storage section 12b, and determines if each of the content symbol data 52 contained in the received user reproduction result data concerns a user having which user attribute.

Thereafter, the content symbol data 52 which is contained, together with the user attribute specifying data 50 for specifying the user attribute described by the user attribute data, in the user reproduction result data is stored in the analyzed data storage section 12d in the manner of being associated with the user attribute data 54 of each user, whereby analyzed data concerning each user attribute is created.

The analyzed data storage section symbol analyzing section 12e reads the content symbol data which is stored in the analyzed data storage section 12d in the manner of being associated with each of the user attributes, and conducts symbol analysis for every user attribute. The symbol analyzed result is temporarily stored in the analyzed result storage section 12f for every user attribute, and sent to the content reproduction device 14 at an appropriate time, such as when the content reproduction device 14 is activated or the like. In the above, the communication section 12a receives the user attribute specifying data 50 from the content reproduction device 14, and forwards to the distribution section 12c.

In the distribution section 12c, the user attribute of the user of the content reproduction device 14 is determined based on the received user attribute specifying data 50 and the user attribute condition data stored in the user attribute condition data storage section 12b. Thereafter, the analyzed result stored in the analyzed result storage section 12f in the manner of being associated with that user attribute is read therefrom, and returned to the content reproduction device 14.

In the following, a structure of the analyzing section 12e will be described.

Figure 8:
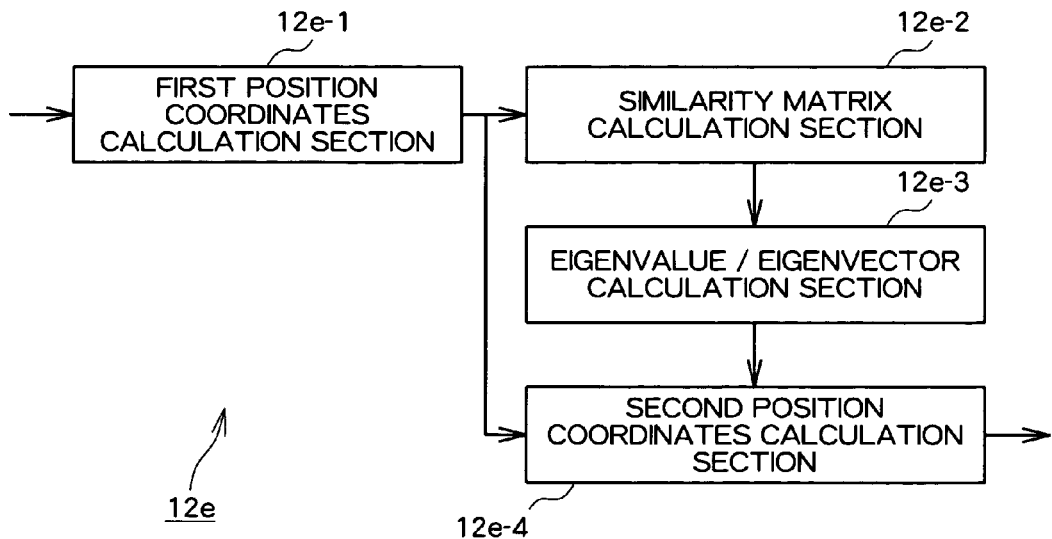
FIG. 8 is a block diagram showing in detail the functions of a symbol analyzing section.

FIG. 8 is a block diagram explaining in detail the functions of the symbol analyzing section 12e. The symbol analyzing section 12e is constructed comprising a first position coordinate calculation section 12e-1, a similarity matrix calculation section 12e-2, an eigenvalue/eigenvector calculation section 12e-3, and a second position coordinate calculation section 12e-4.

Initially, the first position coordinate calculation section 12e-1 calculates the position coordinates in the first space, of each of the symbols in a symbol (word) group contained in each of the content symbol data stored in the analyzed data storage section 12d, as described above. The thus calculated position coordinates are supplied to the similarity matrix calculation section 12e-2 and the second position coordinate calculation section 12e-4.

The similarity matrix calculation section 12e-2 calculates the similarity Hij among the respective words according to the above-described expression (2), and calculates a similarity matrix H using the calculated similarities Hij as matrix elements. The eigenvalue/eigenvector calculation section 12e-3 then calculates eigenvalues/eigenvectors of the thus calculated similarity matrix H. As the similarity matrix H is a real symmetrical matrix, the eigenvalue/eigenvector thereof can be readily obtained by means of a method, such as power multiplication, or the like, which is appropriate for computer processing.

The second position coordinate calculation section 12e-4 selects all or a predetermined number of eigenvectors from the thus calculated eigenvectors in order, beginning with the one with the largest eigenvalue. Then, the selected eigenvectors are normalized and used as vectors indicative of the characteristic directions of the first space. Then, an inner product of each of these vectors and the position coordinates supplied from the first symbol position coordinates calculation section 12e-1 is calculated to thereby calculate the position coordinates of each word in the second space. These position coordinates are stored in the analyzed result storage section 12f as an analyzed result in the manner of being associated with the user attribute.

In the following, the content reproduction device 14 will be described in detail.

Figure 9:
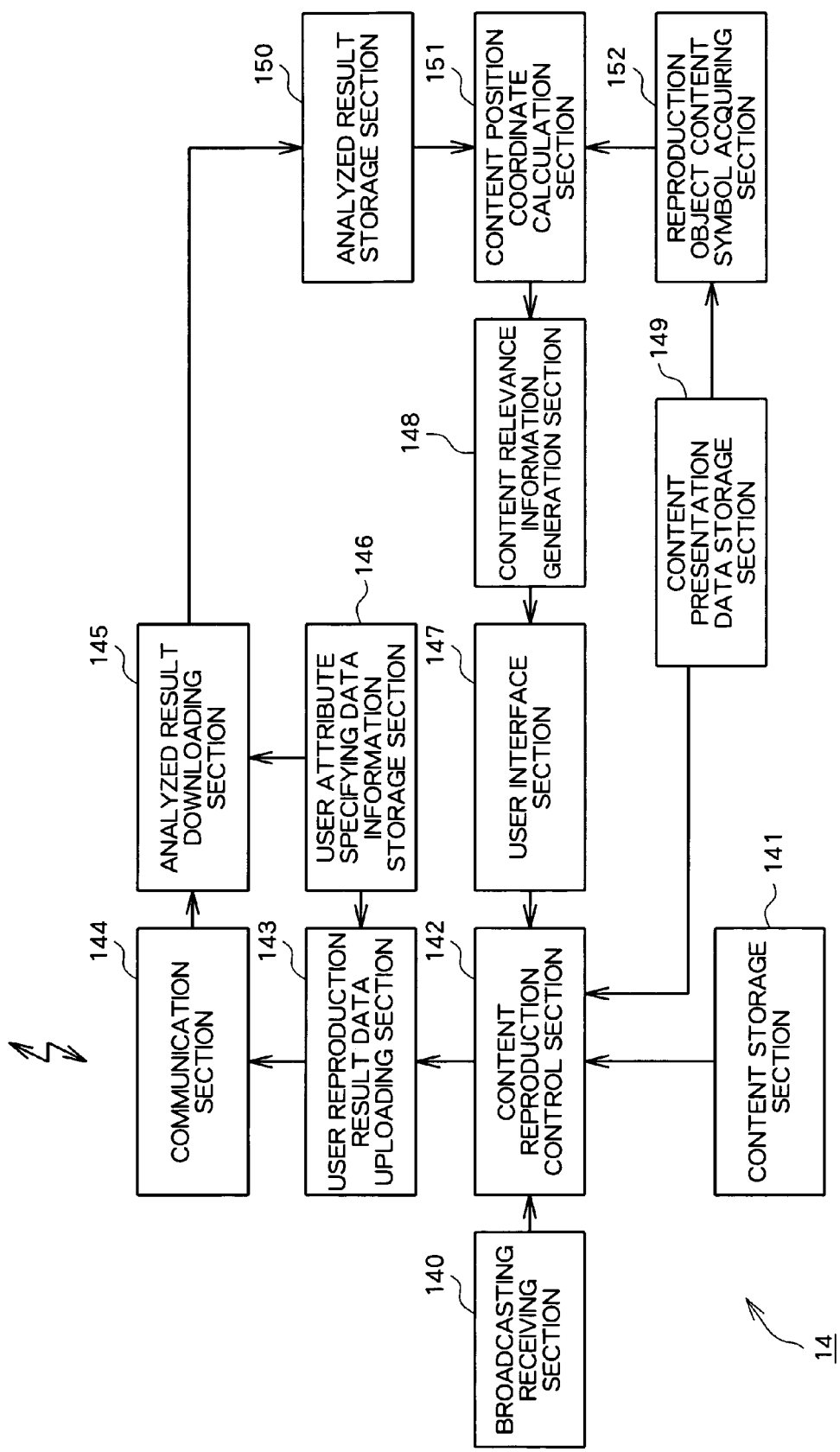
FIG. 9 is a block diagram showing the functions of a content reproduction device.

FIG. 9 is a block diagram explaining the functions of the content reproduction device 14. As shown in FIG. 9, the content reproduction device 14 is constructed comprising, in terms of functions, a broadcasting receiving section 140, a content storage section 141, a content reproduction control section 142, a user reproduction result data uploading section 143, a communication section 144, an analyzed result downloading section 145, a user attribute specifying data information storage section 146, a user interface section 147, a content relevance information generation section 148, a content presentation data storage section 149, an analyzed result storage section 150, a content position coordinate calculation section 151, and a reproduction object content symbol (or a content symbol to be reproduced) acquiring section 152. These functions are realized by the control section 14b-5 of the content reproduction device 14 by executing a program according to this embodiment. This program may be stored in a computer readable information storage medium, such as a CD-ROM, a DVD-ROM, or the like, and read from the information storage medium and installed into the content reproduction device 14.

The content presentation data storage section 149 is constructed with the storage device 14b-4 as a major element, and stores the content presentation data of each of the contents, contained in the EPG data. The reproduction object content symbol acquiring section 152 obtains the content presentation data of the content to be reproduced, and extracts one or moreword s therefrom. The extracted words are provided to the content position coordinate calculation section 151.

The communication section 144 is connected to the network 16, and carries out data exchange with respect to the content presentation assistance server 12. The analyzed result downloading section 145 reads user attribute specifying data 50 from the user attribute specifying data storage section 146, and sends the data via the communication section 144 to the content presentation assistance server 12. Then, the analyzed result downloading section 145 receives as a response the analyzed result which is stored in the analyzed result storage section 12f in the manner of being associated with the user attribute which is specified by the user attribute specifying data 50. The received analyzed result is stored in the analyzed result storage section 150.

The content position coordinate calculation section 151 calculates the position coordinates of the content to be reproduced in the second space. Specifically, with respect to the content to be reproduced, the content position coordinate calculation section 151 reads from the analyzed result storage section 150, the position coordinates in the second space, of the words obtained by the reproduction object content symbol acquiring section 152, and defines the position of the barycenter or the weighted barycenter of these position coordinates as the position coordinates of that content.

The content relevance information generation section 148 generates, as content relevance information 30, an image representative of the entirety or a part of the second space where the thus calculated position coordinates are distinctively displayed by markers 32.

The user interface section 147 is constructed comprising a control device 14b-5 and an operation key section 14b-6, and displays the content relevance information 30 generated by the content relevance information generation section 148 in the home-use television image receiver 14a. Also, the cursor 36 is moved on the screen according to the operation of the cursor moving key which is carried out via the operation key section 14b-6. When the reproduction key is operated, an instruction is given to the content reproduction control section 142, requesting reproduction of the content corresponding to the marker 32 displayed at the position where the cursor 36 is then located.

The content storage section 141 is constructed with the storage device 14b-4 and the disk reading and writing device 14b-2 as major elements, while the broadcasting receiving section 140 is constructed with the broadcast tuner 14b-1 as a major element. Further, the content reproduction control section 142 controls the content player 14b-3 according to an instruction sent from the user interface section 147, obtains the content corresponding to the position where the cursor 36 is then placed from the content storage section 141 or the broadcasting receiving section 140, and outputs to the home-use television image receiver 14a.

In the above, as for the content reproduced, the content presentation data is obtained from the content presentation data storage section 149, and the words contained therein are extracted. Thereafter, the content symbol data 52 which contains the words is generated, and then supplied to the user reproduction result data uploading section 143.

The user reproduction result data uploading section 143 adds the user attribute specifying data 50 read from the user attribute specifying data storage section 146 to the content symbol data 52 supplied as described above to thereby generate user reproduction result data, and sends via the communication section 144 to the content presentation assistance server 12.

According to the above-described content presentation system 10, as word analysis is carried out utilizing a word which is relevant to the content which is actually reproduced by many content reproduction devices 14, word analysis in which the real state of reviewing by typical viewers is reflected can be attained.

Further, as symbol analysis is carried out for every user attribute, a difference in the meaning of the symbols depending on the user attributes can be reflected in the analyzed result. That is, where the meaning of a word may vary depending on the generation or sex, this system can display the content relevance information 30 with such a difference reflected.

Still further, with an arrangement in which a user desirably selects content while referring to the content relevance information 30, the user can instantly find the content which meets their current taste from many contents while referring to the content relevance information 30 without the need to input a search condition or the like.

It should be noted that the present invention is not limited to the above-described embodiment and the scope of the present invention covers a variety of modified embodiments. For example, although a word is obtained from the content presentation data contained in the EPG data in the above description, a word may alternatively be obtained from the content itself. Further, a "symbol" is not limited to a word, and may alternatively be any other information such as an image or the like.

Further, instead of the above-described arrangement in which the content presentation assistance server 12 carries out symbol analysis, an arrangement is also applicable in which the content presentation assistance server 12 carries out only collection of user reproduction result data concerning the respective users and generation of analyzed data for the respective user attributes, and each of the content reproduction devices 14 receives analyzed data according to the user attribute of the user of that content reproduction device 14 or analyzed data with respect to all user attributes from the content presentation assistance server 12 so that symbol analysis is carried out on the content reproduction device 14 side.

Figure 10:
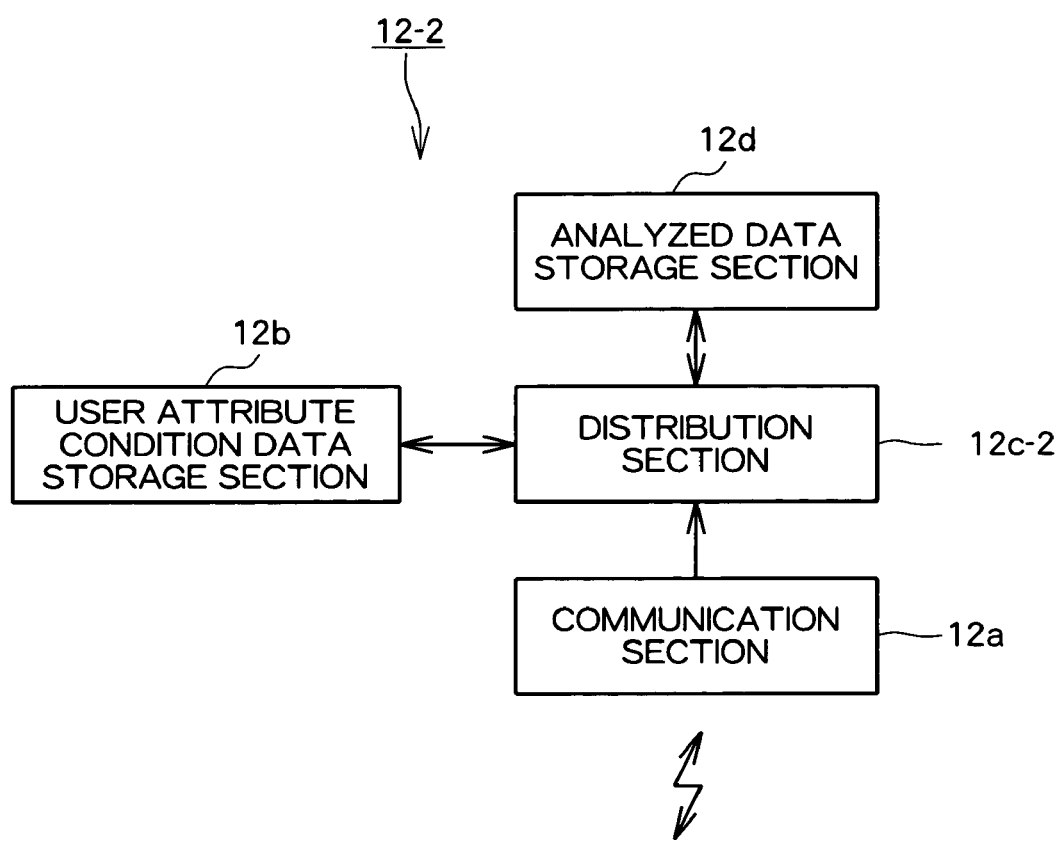
FIG. 10 is a block diagram showing the functions of a modified example of the content presentation assistance server.

FIG. 10 is a block diagram showing the functions of the content presentation assistance server 12-2 according to this modified example. FIG. 11 is a block diagram showing the functions of the content reproduction device 14-2 according to this modified example. The content presentation assistance server 12-2 shown in FIG. 10 is different from the content presentation assistance server 12 shown in FIG. 7 in that the symbol analyzing section 12e and the analyzed result storage section 12f are not provided and that a distribution section 12c-2 substitutes for the distribution section 12c.

Also, the content reproduction device 14-2 shown in FIG. 11 is different from the content reproduction device 14 shown in FIG. 9 in that a symbol analyzing section 154 is provided and that an analyzed data downloading section 153 substitutes for the analyzed result downloading section 145.

In the content reproduction device 14-2, the analyzed data downloading section 153 sends user attribute specifying data to the content presentation assistance server 12-2 at desired timing to request downloading of the analyzed data.

In the content presentation assistance server 12-2, upon receipt of the user attribute specifying data, the distribution section 12c-2 refers to the content stored in the user attribute condition data storage section 12b and determines to which user attribute the user specified by the received user attribute specifying data belongs. Then, the analyzed data concerning the determined user attribute is read from the analyzed data storage section 12d and returned to the content reproduction device 14-2.

In the content reproduction device 14-2, the analyzed data downloading section 153 supplies the analyzed data returned from the content presentation assistance server 12-2 to the symbol analyzing section 154, which in turn carries out symbol analysis. The symbol analysis to be carried out by the symbol analyzing section 154 is identical to that which is carried out by the symbol analyzing section 12e of the content presentation assistance server 12, and thus not described in detail here. The analyzed result is stored in the analyzed result storage section 150 and used in generation of the content relevance information.

The above-described arrangement also enables generation, and displaying in the home-use television image receiver 14a, of the content relevance information.

What is claimed is:

1. A content presentation system comprising:
   a content presentation assistance server having a first central processing unit and a first memory, and
   a plurality of content reproduction devices each having a second central processing unit and a second memory connected via a network for communication to the content presentation assistance server,
   the content presentation assistance server programmed to:
   analyze, for every user attribute, relevance of one or more words based on the number of words used in the content presentation data or the content, wherein the one or more words are relevant to the content reproduced according to the designation of the user having that user attribute, and send an analyzed result to the content reproduction device used by the user having user attribute relevant to that analyzed result, and the content reproduction devices each programmed to:

reproduce content among one or more reproduction object contents according to a designation by a user, receive the analyzed result sent from the content presentation assistance server, acquire one or more words obtained from content presentation data or content reproduced relevant to some or all of the one or more reproduction object contents, and display content relevance information which describes relevance of some or all of the one or more reproduction object contents based on the analyzed result and the words acquired, wherein the analysis by said content presentation assistance server arranges the one or more words in a first space based on the number of the one or more words used in the content presentation data or the content, wherein coordinate axes of a coordinate system define the first space each disposed for the content presentation data or the content, and the analysis by said content presentation assistance server determines position coordinates of the one or more words in the coordinate system, and wherein the analysis by said content presentation assistance server analyzes the relevance based on the one or more words arranged in the first space.

2. The content presentation system according to claim 1, wherein the content reproduction devices each are further programmed to:

generate, for each of some or all of the contents reproduced, content symbol data containing one or more words relevant to that content, and send to the content presentation assistance server, user reproduction result data which contains information concerning the user of that content reproduction device and the content symbol, the content presentation assistance server further programmed to:

receive the user reproduction result data sent from each of the content reproduction devices, and analyze, for every user attribute of the users of the content reproduction devices, the relevance of the words contained in the content symbol data based on the content symbol data which is contained, together with the information concerning the user having that user attribute, in the user reproduction result data.

3. The content presentation system according to claim 1, wherein analyzing the relevance of one or more words includes:

calculating position coordinates in a first space having coordinate axes each corresponding to each of the contents reproduced according to the designation of the user having each user attribute, wherein the words are relevant to the contents, and calculating one or more characteristic directions in the first space based on the position coordinates, and display of content relevance information includes:

calculating position coordinates in a second space having coordinate axes each corresponding to each of the respective characteristic directions, of some or all of the one or more reproduction object contents based on the words relevant to the contents reproduced according to the designation of the user having each user attribute and the words acquired, and display as the content relevance information an image representative of a part or whole of the second space where the position coordinates of some or all of the contents are distinctively displayed.

4. The content presentation system according to claim 3, wherein calculate the position coordinates includes calculating position coordinates of the words relevant to the contents reproduced according to the designation of the user having each user attribute, the position coordinates having as coordinate components, values each indicative of presence, absence, or degree of relevance to each of the contents reproduced according to the designation of the user.

5. The content presentation system according to claim 4, wherein calculate one or more characteristic directions includes calculating one or more eigenvectors of a similarity matrix which has as elements similarities between the position coordinates and determine the one or more eigenvectors as the one or more characteristic directions.

6. The content presentation system according to claim 3, wherein analyze relevance of one or more words includes calculating position coordinates in the second space, of the words, based on the characteristic direction and each of the position coordinates, and calculating position coordinates in a second space includes acquiring position coordinates in the second space, of some or all of the words acquired from among the position coordinates of the words, and calculating position coordinates of some or all of the one or more reproduction object contents based on the position coordinates thereof.

7. The content presentation system according to claim 6, wherein the analyze relevance of one or more words includes calculating position coordinates in the second space, of the words, based on an inner product of the characteristic direction and the position coordinates.

8. A content presentation system according to claim 1, wherein the first space is defined by three or more coordinate axes.

9. A content presentation system having a content presentation assistance server and a plurality of content reproduction devices connected via a network for communication to the content presentation assistance server, wherein the content reproduction devices each have a second central processing unit and a second memory programmed to:

reproduce content among one or more reproduction object contents according to designation by a user, generate, for each of some or all of the contents reproduced, content symbol data containing one or more words relevant to that content, and send, to the content presentation assistance server, user reproduction result data which contains information concerning the user and the content symbol data, and the content presentation assistance server having a first central processing unit and a first memory programmed to:

receive the user reproduction result data sent from each of the content reproduction devices, generate, for each of a plurality of user attributes, analyzed data which contains the content symbol data which is contained, together with the information concerning the user having that user attribute, in the user reproduction result data, and send the analyzed data relevant to some or all of the user attributes to some or all of the plurality of content reproduction devices, the content reproduction device each further programmed to:

receive the analyzed data, analyze relevance of the one or more words contained in the content symbol data based on the number of the one or more words used in the content presentation data or the content, wherein the one or more words are based on the content symbol data contained in the analyzed data relevant to the user attribute of the user of at least that content reproduction device, acquire one or more words relevant to some or all of the one or more production object contents, and display content relevance information which describes relevance of some or all of the one or more reproduction object contents with respect to one another, based on an analyzed result and the one or more words, wherein the one or more words are arranged based on the number of words used in the content presentation data or the content, wherein coordinate axes of a coordinate system define the first space each disposed for the content presentation data or the content, and the analysis of the relevance of the one or wore wordst determines position coordinates of the one or more words in the coordinate system, and wherein the relevance based on the one or more words arranged in the first space is analyzed.

10. A content presentation method which uses content presentation system having a content presentation assistance server and a plurality of content reproduction devices connected via a network for communication to the content presentation assistance server, the method comprising:

a reproduction step of reproducing, with each of the content reproduction devices, content among one or more reproduction object contents according to designation by a user;

a symbol analysis step of analyzing by the content presentation assistance server, for every user attribute, relevance of one or more words based on the number of words used in the content presentation data or the content, wherein the one or more words are obtained from content presentation data or content reproduced by the content reproduction devices;

an analyzed result transmission step of sending, using the content presentation assistance server, an analyzed result obtained in the symbol analysis step to the content reproduction device used by the user having user attribute relevant to that analyzed result;

an analyzed result receiving step of receiving, with each of the content reproduction devices, an analyzed result obtained in the symbol analysis step and sent from the content presentation assistance server;

a reproduction object content symbol acquiring step of acquiring, with each of the content reproduction devices, one or more words obtained from content presentation data or content reproduced by the content reproduction devices; and a content relevance information display step of displaying, with each of the content reproduction devices, content relevance information which describes relevance of some or all of the one or more reproduction object contents, based on the analyzed result received in the analyzed result receiving step and the words acquired in the reproduction object content symbol acquiring step, wherein the symbol analysis step arranges the one or more words in a first space based on the number of the one or more words used in the content presentation data or the content, wherein coordinate axes of a coordinate system define the first space each disposed for the content presentation data or the content, and the symbol analysis step includes determining position coordinates of the one or more words in the coordinate system, and wherein the symbol analysis step includes analyzing the relevance based on the one or more words arranged in the first space.

11. A content presentation assistance server having a central processing unit and a memory and connected via a network for communication with a plurality of content reproduction devices the contents presentation server programmed to:

receive one or more words obtained from content presentation data or content reproduced by the content reproduction devices, together with information concerning a user of that content reproduction device;

analyze, for every user attribute of the users of the content reproduction devices, relevance of the one or more words based on the number of words used in the content presentation data or the content, wherein the one or more words are sent from the content reproduction devices used by the users having that user attribute; and send an analyzed result to each of the content reproduction devices used by the users having that user attribute relevant to the analyzed result, arrange the one or more words in a first space based on the number of the one or more words used in the content presentation data or the content, wherein coordinate axes of a coordinate system define the first space each disposed for the content presentation data or the content, and the analysis of the relevance of the one or more words determines position coordinates of the one or more words in the coordinate system, and wherein analysis of the relevance of the one or more words includes analyzing the relevance based on the one or more words arranged in the first space.

12. A content presentation assistance method employed by a content presentation assistance server connected via a network for communication with a plurality of content reproduction devices, comprising:

a symbol receiving step of receiving one or more symbols words obtained from content presentation data or content reproduced by the content reproduction devices, together with information concerning a user of that content reproduction device;

a symbol analysis step of analyzing, for every user attribute of the users of the content reproduction devices, relevance of the one or more words based on the number of words used in the content presentation data or the content, wherein the one or more words are sent from the content reproduction devices used by the users having that user attribute; and an analyzed result transmission step of sending an analyzed result obtained in the symbol analysis step to each of the content reproduction devices used by the users having that user attribute relevant to the analyzed result, wherein the symbol analysis step includes arranging the one or more words in a first space based on the number of the one or more words used in the content presentation data or the content, wherein coordinate axes of a coordinate system define the first space each disposed for the content presentation data or the content, and the symbol analysis step includes determining position coordinates of the one or more words in the coordinate system, and wherein the symbol analysis step includes analyzing the relevance based on the one or more words arranged in the first space.

13. A non-transitory computer readable information storage medium storing a program to be executed by a content presentation assistance server connected via a network for communication with a plurality of content reproduction devices, for causing the content presentation assistance server to perform steps comprising:

symbol receiving step for receiving one or more words obtained from content presentation data or content reproduced by the content reproduction devices, together with information concerning a user of that content reproduction device;

symbol analysis step for analyzing, for every user attribute of the users of the content reproduction devices, relevance of the one or more words based on the number of words used in the content presentation data or the content, wherein the one or more words are sent from the content reproduction devices used by the users having that user attribute; and analyzed result transmission step for sending an analyzed result to each of the content reproduction devices used by the users having that user attribute relevant to the analyzed result, wherein the symbol analysis step includes arranging the one or more words in a first space based on the number of the one or more words used in the content presentation data or the content, wherein coordinate axes of a coordinate system define the first space each disposed for the content presentation data or the content, and the symbol analysis step includes determining position coordinates of the one or more words in the coordinate system, and wherein the symbol analysis includes analyzing the relevance of the one or more words includes analyzing the relevance based on the one or more words arranged in the first space.

14. A content presentation method which uses a content presentation system having a content presentation assistance server and a plurality of content reproduction devices connected via a network for communication to the content presentation assistance server, the method comprising:

a reproduction step of reproducing, with each of the content reproduction devices, content among one or more reproduction object contents according to designation by a user;

a content symbol data generation step of generating, with each of the content reproduction devices, for each of some or all of the contents reproduced in the reproduction step, content symbol data containing one or more words relevant to that content;

a user reproduction result data transmission step of sending, with each of the content reproduction devices, to the content presentation assistance server, user reproduction result data which contains information concerning the user and the content symbol data generated in the content symbol data generation step;

a user reproduction result data receiving step of receiving, with the content presentation assistance server, the user reproduction result data sent in the user reproduction result data transmission step from each of the content reproduction devices;

an analyzed data generation step of generating, with the content presentation assistance server, for each of a plurality of user attributes, analyzed data which contains the content symbol data which is contained, together with the information concerning the user having that user attribute, in the user reproduction result data;

analyzed data transmission step of sending, with the content presentation assistance server, the analyzed data relevant to some or all of the user attributes to some or all of the plurality of content reproduction devices;

an analyzed data receiving step of receiving, with each of the content reproduction devices, the analyzed data sent in the analyzed data transmission step;

a symbol analysis step of analyzing, with each of the content reproduction devices, relevance of the one or more words based on the number of words used in the content presentation data or the content, wherein the one or more words are based on the content symbol data contained in the analyzed data relevant to user attribute of the user of at least that content reproduction device;

a reproduction object content symbol acquiring step of acquiring, with each of the content reproduction devices, one or more words obtained from content presentation data or content reproduced by the content reproduction devices, and a content relevance information display step of displaying, with each of the content reproduction devices, content relevance information which describes relevance of some or all of the one or more reproduction object contents, based on an analyzed result obtained in the symbol analysis step and the words acquired by the reproduction object content symbol acquiring step, wherein the symbol analysis step arranges the one or more words in a first space based on the number of the one or more words used in the content presentation data or the content, wherein coordinate axes of a coordinate system define the first space each disposed for the content presentation data or the content, and the symbol analysis step determines position coordinates of the one or more words in the coordinate system, and wherein the symbol analysis step analyzes the relevance based on the one or more words arranged in the first space.

15. A content reproduction device having a central processing unit and a memory, the content reproduction device programmed to:

reproduce content among one or more reproduction object contents according to designation by a user, acquire analyzed data, in which the analyzed data contains one or more content symbol data, and the content symbol data contains one or more words relevant to a content reproduced according to designation by a user, and having a user attribute identical to a user attribute of the user;

analyze, for every user attribute, relevance of the one or more words based on the number of words used in the content presentation data or the content, wherein the one or more words are based on the content symbol data contained in the analyzed data;

acquire, for some or all of the one or more reproduction object contents, one or more words relevant to the reproduction object contents; and display content relevance information describing mutual relevance of some or all of the one or more reproduction object contents, based on an analyzed result and the words acquired, wherein the analysis by a content presentation assistance server arranges the one or more words in a first space based on the number of the one or more words used in the content presentation data or the content, wherein coordinate axes of a coordinate system define the first space each disposed for the content presentation data or the content, and analysis of the relevance of the one or more words determines position coordinates of the one or more words in the coordinate system, and wherein the analysis of the relevance of the one or more words includes analyzing the relevance based on the one or more words arranged in the first space.

16. A content reproduction method, comprising:

a reproduction step of reproducing content among one or more reproduction object contents according to designation by a user, an analyzed data acquiring step of acquiring analyzed data, in which the analyzed data contains one or more content symbol data, and the content symbol data contains one or more words relevant to content reproduced according to designation by a user having user attribute identical to user attribute of the user;

a symbol analysis step for analyzing, for every user attribute, relevance of the one or more words based on the number of words used in the content presentation data or the content, wherein the one or more words are based on the content symbol data contained in the analyzed data;

a reproduction object content symbol acquiring step of acquiring, for some or all of the one or more reproduction object contents, one or more words relevant to the reproduction object contents; and a content relevance information display step of displaying content relevance information describing mutual relevance of some or all of the one or more reproduction object contents, based on an analyzed result obtained in the symbol analysis step and the words acquired in the reproduction object content symbol acquiring step, wherein the symbol analysis step arranges the one or more words in a first space based on the number of the one or more words used in the content presentation data or the content, wherein coordinate axes of a coordinate system define the first space each disposed for the content presentation data or the content, and the symbol analysis step includes determining position coordinates of the one or more words in the coordinate system, and wherein the symbol analysis step includes analyzing the relevance based on the one or more words arranged in the first space.

17. A non-transitory computer readable information storage medium storing a program for causing a computer to perform the steps comprising:

reproducing content among one or more reproduction object contents according to designation by a user, acquiring analyzed data, in which the analyzed data contains one or more content symbol data, and the content symbol data contains one or more words relevant to a content reproduced according to designation by a user, and having a user attribute identical to a user attribute of the user;

analyzing, for every user attribute, relevance of the one or more words based on the number of words used in the content presentation data or the content, wherein the one or more words are based on the content symbol data contained in the analyzed data;

acquiring, for some or all of the one or more reproduction object contents, one or more words relevant to the reproduction object contents; and displaying content relevance information describing mutual relevance of some or all of the one or more reproduction object contents, based on an analyzed result and the symbols, wherein the one or more words are arranged in a first space based on the number of the one or more words used in the content presentation data or the content, wherein coordinate axes of a coordinate system define the first space each disposed for the content presentation data or the content, and the symbol analysis step includes determining position coordinates of the one or more words in the coordinate system, and wherein the symbol analysis step includes analyzing the relevance based on the one or more words arranged in the first space.

* * * * *